Figure 1:
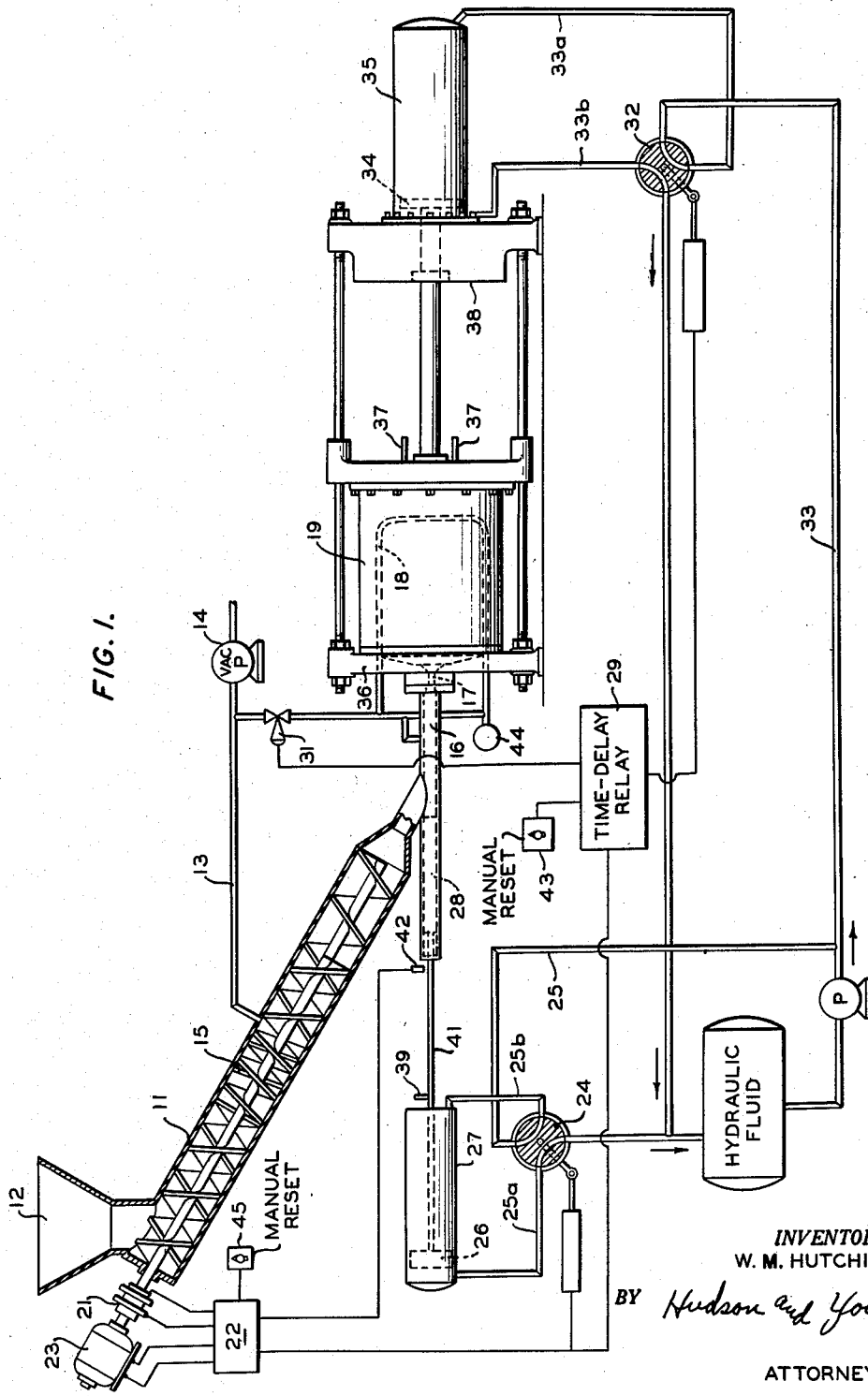

INVENTOR.
W.M. HUTCHINSON
BY Hudson and Young
ATTORNEYS

United States Patent Office 2,926,386
Patented Mar. 1, 1960

2,926,386

MANUFACTURE OF PROPELLANTS

William M. Hutchinson, Bartlesville, Okla., assignor to Phillips Petroleum Company, a corporation of Delaware Application March 7, 1955, Serial No. 492,408

6 Claims. (Cl. 18—30)

This invention relates to the manufacture of propellants. In one of its aspects it relates to a method and apparatus for the manufacture of grains of propellants having high plastic yield points. In another of its aspects, it relates to a combination of extrusion and injection methods of molding propellants so as to exclude free space from within the propellant grain and from between the propellant grain and the mold.

Recently it has been discovered that superior solid propellant mixtures are obtained comprising a solid oxidant such as ammonium nitrate or ammonium perchlorate and a rubbery binder material such as a copolymer of butadiene and a vinylpyridine or other substituted heterocyclic nitrogen base compound, which after incorporation is cured by a quaternization reaction or a vulcanization reaction. Solid propellant mixtures of this nature and a process for their production are disclosed and claimed in copending application Serial No. 284,447, filed April 25, 1952, by W. B. Reynolds and J. E. Pritchard.

Solid propellant mixtures manufactured according to the above described process are semi-solid plastic compounds, prior to curing, which present problems in the molding of "case-bonded" propellants. In the preparation of case-bonded propellants it is necessary that the casing be completely filled, that the propellant be properly deaerated, prior to being molded in final form, and that the molded form shall not become distorted from relaxation when molding pressure is released. These propellant compositions containing a solid oxidant and a binder, having plastic properties in the uncured state, cannot be dissolved in a solvent or otherwise reduced to a fluid state and poured into a mold to set up therein in some manner, therefore, pressure methods must be employed in the molding operation. The propellant compositions, having high plastic yield points, should be "worked" or kneaded during the molding operation so as to insure uniform and substantially complete filling of the case.

Extrusion methods provide the kneading operation and deaeration can be simultaneously accomplished. These plastic materials can be extruded into cylindrical form and cut into lengths, however, it can be seen that introduction of such grains into a metal casing with no intervening space between the grain and the casing involves problems and difficulties. The direct extrusion of the plastic material into an evacuated casing is unsatisfactory because conventional extrusion equipment is unsuitable for operation at the pressures required for complete filling of the casing and furthermore no static pressure stage or "dwell period" can be realized in such operation. The dwell period, which is a continuance of the pressure required to fill the casing, is necessary in order to relax the strains set up in the plastic material upon being compacted in the casing.

Since the principal shortcomings of the extrusion procedure lie in its inapplicability to high pressure operation and for provision of the necessary dwell period, it might appear that compression molding would overcome this difficulty and provide a satisfactory method for producing uniform case-bonded grains. However, when operating in this manner, accurate metering of the plastic material is difficult, resulting in non-uniformity of grains and also deaeration of the propellant material during the molding operation is difficult if not impossible. Furthermore there is no means for kneading the propellant during the compression molding operation.

Injection molding procedures appear to eliminate the foregoing problems in that such methods can be operated under high pressures, provide satisfactory working of the material during the constriction and increased rate of flow of material occasioned by the injection nozzle and furthermore these methods can also provide the necessary dwell period. However, when operating by this method, adequate deaeration is quite difficult, if not impossible and furthermore the low capacity of conventional injection molding equipment is such that only the smaller propellant grains can be molded by a single stroke of the plunger. In order to use this method on large case-bonded propellants, it would be necessary to provide either tremendous magnification of the machine, obviously infeasible from an economic standpoint, or to resort to a multistroke procedure which is impractical because of still greater deaeration problems and other obvious difficulties.

By the method of the present invention, the advantages of the large volume operation of an extrusion procedure and the advantages of high pressure injection molding, adequate working, and proper deaeration of the propellant are realized without the drawbacks occasioned by the use of either procedure separately.

It is therefore an object of this invention to provide an improved method for molding solid propellants.

It is another object of this invention to provide a method for molding solid propellants which are free of voids.

It is another object of the invention to provide a method and an apparatus for molding a case-bonded propellant which is free of voids.

Another object of the invention is to provide an improved method for high pressure molding of solid propellants.

Another object of the invention is to provide an improved method for producing large diameter propellant grains.

Still another object of the invention is the provision of an improved method for producing large grains of a propellant which utilizes a viscous binder.

Figure 2:
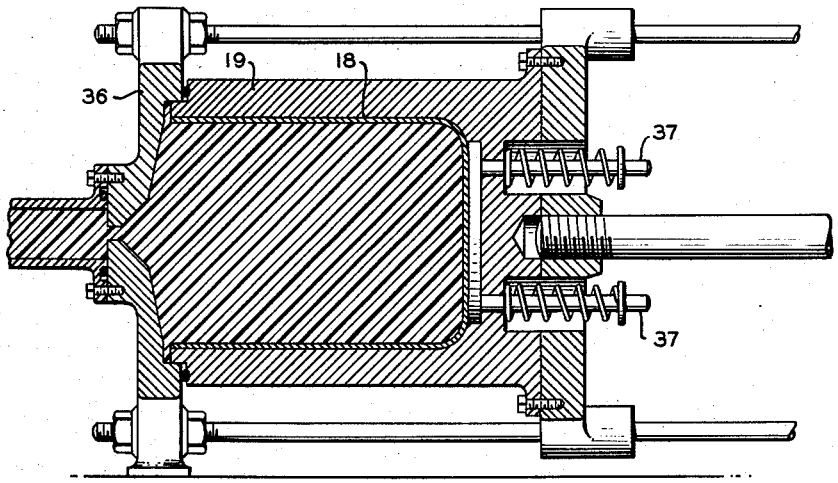
Figure 3:
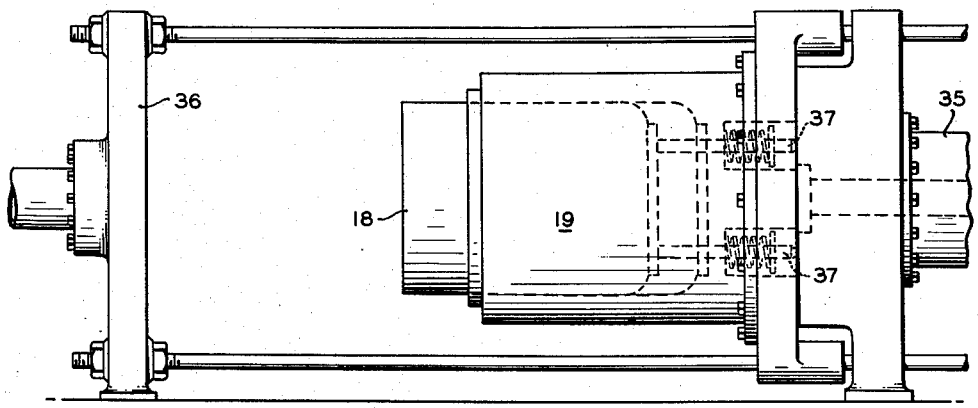
Figure 4:
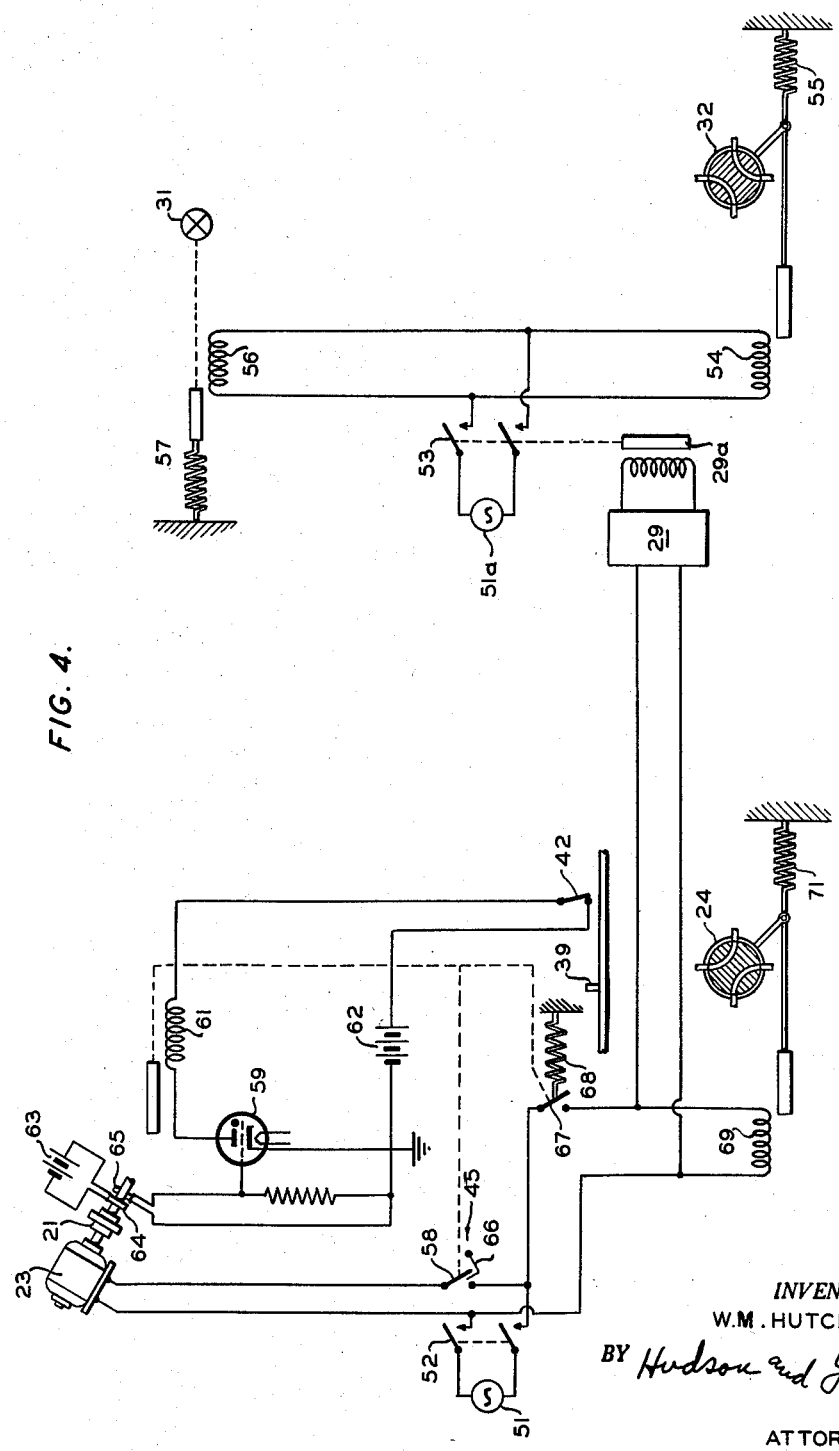

Other and further objects and advantages of this invention will be apparent to those skilled in the art upon study of the accompanying disclosure and drawings wherein:

Figure 1 is a schematic illustration of a specific embodiment of this invention, Figure 2 is a detailed illustration of the mold of the embodiment of Figure 1, Figure 3 is another view of the mold in Figure 2, and Figure 4 shows a specific wiring diagram for operating the embodiment of Figure 1.

Broadly speaking, this invention relates to a method of molding solid propellants which comprises extruding the composition through an injection chamber and into the casing so as to substantially fill the evacuated casing receiving the charge. Additional composition is then forced into the casing and the entire charge within the casing is compacted by pressure applied to an injection piston moving within the injection chamber.

I have discovered that the above method for molding solid propellants is particularly adapted to solid propellant compositions containing a polymeric binder and ranging in consistency from that requiring about 300 p.s.i.g. to that requiring up to about 15,000 p.s.i.g. to extrude the material through a 3/16 inch orifice. The improved method of this invention makes possible the molding of large grains of solid propellant having a desired compact form, being free of voids and being free from any tendency on the part of the solid propellant to shrink from the casing upon release of the molding pressure. The major portion of the composition is introduced into the evacuated casing at a fairly high rate of flow and at a fairly low power requirement, and the final compacting step which requires expending a greater amount of power is confined to injecting a relatively minor amount of the composition into the casing. Thus the expending of a greater amount of power is restricted to a relatively minor portion of the cycle and makes possible the use of light weight equipment for the major portion of the operation of manufacturing a large propellant grain. Furthermore, the compacting pressure is maintained upon the compacted charge for a dwell period so that the strains within the semi-solid propellant are relaxed. Thus the elastic nature of the propellant is spent and there is slight tendency for the propellant to flow out of the casing when the pressure is released.

Referring now to the drawing, and particularly to Figure 1, the various constituents of the propellant, as hereinbefore described, are introduced into extruder 11 through hopper 12. The material in extruder 11 is evacuated through line 13 and vacuum pump 14 at a point downstream from compacting section 15 of extruder 11. The composition passes from extruder 11 through cylinder 16, orifice 17 and into casing 18 positioned in mold 19. Extruder 11 is positioned with respect to chamber 16 so that an abrupt change of direction of propellant is avoided. When casing 18 is substantially filled with propellant composition, the back pressure exerted upon extruder 11 acts upon torque converter 21 positioned in the extruder drive shaft assembly so as to actuate switching means 22 stopping motor 23, moving valve 24 so as to cause fluid in line 25 to flow through line 25a and to act upon piston 26 for a predetermined length of time sufficient to completely fill casing 18 with propellant composition, to compact the propellant composition and to maintain pressure upon the compacted propellant grain for a time sufficient to allow the strains within the propellant grain to become substantially equalized. At the end of the predetermined time delay, the time delay mechanism 29 closes valve 31 and operates valve 32 so as to direct the flow of fluid from line 33 through line 33b so as to act upon piston 34 in cylinder 35 and to remove mold 19 from contact with plate 36. As piston 34 moves in cylinder 35, projections 37 meet plate 38 and eject casing 18 from mold 19. When mold 19 is removed from contact with plate 36, piston 28 is permitted to travel forward in cylinder 16 until contact 39 positioned on shaft 41 connecting pistons 26 and 28 opens switch 42. Any material remaining in cylinder 16 is forced out through orifice 17 and will adhere to the propellant charge in casing 18, thus leaving cylinder 16 and orifice 17 substantially free of propellant composition. When contacts 39 and 42 meet, switching means 22 operates valve 24 so as to reverse the flow of fluid from line 25 and causes piston 26 to move back through cylinder 27 to its retracted position. A cycle is started manually by operation of reset 43.

Reset 43 operates valve 32 so as to cause fluid in line 33 to flow through line 33a moving piston 34 so as to press mold 19 against plate 36. Reset 43 simultaneously opens valve 31 and resets the time delay mechanism. At the end of the cycle the operator places an empty casing in mold 19 and does any cleaning of propellant from the surface of plate 36, before starting the necessary cycle.

When mold 19 is pressed against plate 36, vacuum pump 14 begins to evacuate the casing. When pressure gauge 44 indicates that the mold is substantially evacuated the operator starts motor 23 by operation of reset 45.

Referring now to Figure 4, a source of electric energy is indicated at 51 controlled by master switch 52. The cycle is started by operation of the manual reset 43 of Figure 1 which closes switch 53 shown connected to a power source 51a which can conventionally be the same as power source 51. Closing switch 53 causes current to flow through solenoid 54 so as to operate valve 32 against the tension of spring 55. Simultaneously with the flow of current through solenoid 54, current will flow through solenoid 56 opening valve 31 against the tension of spring 57.

Operation of manual reset 45 closes switch 58, starting motor 23. Torque converter 21, which can be a conventional strain gauge operated torque indicating device, transmits a potential to the grid of the tube in the thyratron circuit 59 through slip rings 64 and 65. When the back pressure on extruder 11 reaches a predetermined level, indicating that casing 18 in mold 19 is substantially filled, torque converter 21 actuates the thyratron circuit so as to cause solenoid 61 to open switch 58, which is held in open position by latch 66, stopping motor 23. The thyratron circuit simultaneously closes normally open switch 67 against the tension of spring 68 energizing solenoid 69 so as to operate valve 24 against the tension of spring 71 and to simultaneously energize time delay relay 29. After a predetermined delay interval, time delay relay 29 opens switch 53 allowing spring 55 to operate valve 32 and allowing spring 57 to operate valve 31. The removal of mold 19 from plate 36 allows piston 28 to continue its travel through cylinder 16, as shown in Figure 1, until contact 39 meets with and opens switch 42. Opening switch 42 deenergizes the thyratron circuit so as to allow spring 68 to open switch 67 so as to allow spring 71 to operate valve 24. Thus a cycle is completed.

Torque converter 21 can be any of the various torque indicating devices capable of transmitting a signal at a predetermined level of torque. The torque converter illustrated in Figures 1 and 4 is a conventional strain gauge torque indicating device wherein a strain gauge comprises one arm of a bridge circuit so that torque unbalances the bridge circuit and allows current to flow through the thyratron circuit.

The thyratron circuit is a conventional circuit and no heater connections have been shown for the thyratron tube and batteries are shown for simplicity for tracing the circuit and describing its operation. It will be understood that any of the usual methods of energizing the circuit such as transformers and rectifiers can be used. Battery 63 energizes the grid of the thyratron tube when the bridge circuit in torque converter 21 becomes unbalanced as a result of applied torque. Battery 62 energizes the plate of the thyratron tube so that current continues to flow through the circuit after motor 23 is stopped and energy is no longer available to the grid of the thyratron tube from battery 63.

Latching switch 58 is conventional. Switch 58 is latched in open position and is released by manual reset 45. Switch 53 is manually closed by operation of reset 45 and is opened by time delay relay 29. Spring loaded solenoid valves illustrated are conventional.

Mold 19 is shown held against plate 36 by the pressure of fluid upon piston 34 in cylinder 35. However, latching means such as hydraulic clamps can be employed so as to positively lock mold 19 against plate 36 if desired. Such clamping means are well known to those skilled in the art.

As illustrated in Figure 1, hydraulic fluid is continuously pumped to hydraulic cylinders 27 and 35. However, if desired, the pump can be started and stopped as needed.

Better understanding of this invention will be obtained by reference to the following example, which is presented for the purpose of exemplification of the invention and should not be used to unduly limit the invention.

*Example*

A mixture of 75 parts of ammonium nitrate; 21.91 parts of a 90/10 ratio of butadiene/2-methyl-5-vinylpyridine, 20 Mooney copolymer (plastic when uncured); 4.38 parts of a furnace black; 1.51 parts of benzotrichloride; 0.36 part of Butyl-Eight (dithiocarbamate); 0.31 part of sulfur; and 0.91 part of zinc oxide is mixed so as to obtain uniform distribution of the constituents and supplying extruder 11 at a rate of 1200 pounds per hour. Extruder 11 is 11 inches in internal diameter and is operated at approximately 20 r.p.m. The propellant mixture is charged to evacuated casing 18 in mold 19 having a capacity of 80 pounds of propellant mixture. Mold 19 is held against plate 36 by fluid pressure upon piston 34 in cylinder 35. When a pressure of about 1500 p.s.i.g. is exerted upon the extruder as a result of mold 19 being about 90 percent filled, the torque converter 21 operates switching means so as to stop motor 23, to operate valve 24 by means of solenoid 69 and to energize time delay relay 29. Injection piston 28 forces propellant material within cylinder 16 into casing 18 so as to substantially completely fill casing 18 with propellant at a pressure of about 15,000 p.s.i.g. Piston 28 continues to maintain a pressure of about 15,000 p.s.i.g. upon the propellant charge in casing 18 for a period of about 45 seconds as determined by time delay relay 29. At the end of this dwell period of about 45 seconds, time delay relay 29 operates valve 32 so as to reverse the flow of fluid to cylinder 35 thus withdrawing mold 19 containing filled casing 18, from plate 36, and simultaneously closes valve 31. Piston 28 travels through cylinder 16 ejecting propellant through orifice 17 as mold 19 is withdrawn from plate 36 until contact 39 opens switch 42 so as to deenergize the thyratron circuit and allow spring 68 to open switch 67 deenergizing solenoid 69 so as to allow spring 71 to operate valve 24 reversing the flow of fluid to cylinder 27 thus returning pistons 26 and 28 to retracted position. As mold 19 is withdrawn from plate 36, projections 37 contact plate 38 and eject casing 18, filled with propellant charge, from mold 19.

A new cycle is started by placing an empty casing in mold 19, operating manual reset 43 and then operating manual reset 45 when pressure gauge 44 indicates that the casing in mold 19 is substantially evacuated.

Variations and modifications are possible within the scope of the disclosure of the present invention, the essence of which is the provision of a novel method and apparatus for forming solid propellant charges of maximum density which comprises extruding the propellant composition into the mold through an injection cylinder and then forcing additional propellant composition into the mold by means of a compression piston acting upon the material within the injection cylinder.

That which is claimed is:

1. The process of molding case-bonded propellants comprising a mixture having a high yield point of a solid oxidant and an uncured rubber binder which comprises introducing said mixture of solid oxidant and plastic binder into a molding zone through an intermediate zone with a minimum of change of direction of flow so as to substantially fill said molding zone; forcefully decreasing the volume of said intermediate zone at a pressure sufficient to compact said mixture in said molding zone; maintaining the pressure on said mixture for a period of time sufficient to spend the elastic nature of said mixture; and removing free gaseous material from said molding zone during the filling steps.

2. The process of molding case-bonded propellants comprising a mixture having a high yield point of a solid oxidant and an uncured rubber binder which comprises extruding said mixture of solid oxidant and rubbery binder from an extruding zone into a molding zone through an intermediate zone with a minimum change of direction of flow so as to substantially fill said molding zone and said intermediate zone; deaerating said extruding zone, said intermediate zone and said molding zone; subjecting said material in said intermediate zone to an additional pressure sufficient to compact said mixture in said molding zone; and maintaining the pressure on said composition in said molding zone for a period of time sufficient to spend the elastic nature of said propellant.

3. A device for molding semi-solid propellant material having a high yield point which comprises a mold adapted to receive a casing for containing said propellant material; extruder means; a chamber in communication with said extruder means and with said mold said extruder means and said chamber being positioned with respect to said mold so that a minimum change of direction of flow of said propellant material is required; a piston adapted to move within said chamber; means for actuating said piston; means for actuating said extruder; means adapted so as to stop said extruder actuating means, to start said piston actuating means when a predetermined back pressure is exerted upon said extruder means resulting from said mold and said chamber being substantially filled with propellant material, and time delay means to operate said piston actuating means for a predetermined time sufficient to relax strains set up in said propellant; means adapted to remove said mold from communication with said chamber after a predetermined time; and means to deaerate said extruder, chamber and mold.

4. A device for molding semi-solid propellant material having a high yield point into a case-bonded grain which comprises a mold adapted to receive a case for containing said case-bonded grain; means for deaerating said mold; extruder means; means for actuating said extruder; cylinder means in communication with said extruder; means for placing said mold in communication with said cylinder; means for removing said mold from communication with said cylinder; a piston adapted so as to reciprocate within said cylinder; a time delay relay means; means for actuating said piston; torque sensitive means adapted so as to stop said extruder actuating means, to start said piston actuating means and to start said time delay relay means; and means actuated by said time delay relay means and adapted so as to remove said mold from communication with said cylinder and to eject said propellant from said mold after a predetermined time sufficient to relax strains set up in said propellant.

5. The process of molding case-bonded propellants comprising a mixture having a high yield point of a solid oxidant and an uncured rubber binder which comprises introducing said mixture of solid oxident and plastic binder into a molding zone through an intermediate zone with a minimum of change of direction of flow so as to substantially fill said molding zone; forcefully decreasing the volume of said intermediate zone at a pressure sufficient to compact said mixture in said molding zone; maintaining the pressure on said mixture for about 45 seconds to relieve strains in said mixture; and removing free gaseous material from said molding zone during the filling steps.

6. The process of molding case-bonded propellants comprising a mixture having a high yield point of a solid oxidant and an uncured rubber binder which comprises extruding said mixture of solid oxidant and rubbery binder from an extruding zone into a molding zone through an intermediate zone with a minimum change of direction of flow so as to substantially fill said molding zone and said intermediate zone; deaerating said extruding zone, said intermediate zone, and said molding zone; subjecting said material in said intermediate zone to an additional pressure sufficient to compact said mixture in said molding zone; and maintaining the pressure on said composition in said molding zone for about 45 seconds to relieve the strains in said propellant.

References Cited in the file of this patent

UNITED STATES PATENTS

| | | |
|---|---|---|
| 2,359,840 | Goessling | Oct. 10, 1944 |
| 2,469,342 | Richardson | May 3, 1949 |
| 2,505,540 | Goldhard | Apr. 25, 1950 |
| 2,627,087 | Hendry | Feb. 3, 1953 |
| 2,671,247 | Lester | Mar. 9, 1954 |
| 2,675,583 | Scherry | Apr. 20, 1954 |

FOREIGN PATENTS

| | | |
|---|---|---|
| 655,585 | Great Britain | July 25, 1951 |
| 1,064,777 | France | Dec. 30, 1953 |

OTHER REFERENCES

Report entitled "Jet Propulsion," prepared by GALCIT for the Air Technical Service Command (1946), page 271.